United States Patent Office 3,531,302
Patented Sept. 29, 1970

3,531,302
HEAT SET PRINTING INK VEHICLE
Ludwig P. Horn, Deerfield, Ill., assignor to Lawter Chemicals, Inc., Chicago, Ill., a corporation of Delaware
No Drawing. Continuation-in-part of application Ser. No. 499,081, Oct. 20, 1965, which is a continuation-in-part of application Ser. No. 343,442, Jan. 29, 1964, which in turn is a continuation-in-part of application Ser. No. 188,266, Apr. 17, 1962. This application Nov. 20, 1967, Ser. No. 684,547
Int. Cl. C09d 11/06, 11/08
U.S. Cl. 106—27        10 Claims

ABSTRACT OF THE DISCLOSURE

The invention comprises the preparation of a vehicle for heat set printing inks in which the vehicle includes a solvent component which facilitates the application of the ink but is flashed off during setting of the ink in which the invention resides in the vehicle and its method of preparation in which the resinous component is prepared by reacting a polyvalent metal alcoholate in which the alcohol groups of the alcoholate are formed of alcohols having from 1 to 5 carbon atoms and in which the polyvalent metal alcoholate is first reacted with a monohydroxy compounds selected from the group consisting of a monohydroxy glycol ester, a monohydroxy glycerol ether, a monohydroxy glycol ester, a monohydroxy glycerol ester, a monohydroxy oxo-alcohol and mono-hydroxy fatty alcohol in which the reaction is carried out at a temperature above the boiling point temperature of the alcoholate and reacting the reaction product with a varnish formed of a modified rosin or resin having at least one free carboxyl group selected from the group consisting of a rosin ester, a dibasic acid modified rosin ester and a rosin ester modified phenolic resin and a resin soluble in aliphatic solvents having a KB value of 20–40 in which the reaction is carried out at a temperature in excess of 300° F. with the reaction product combined with the resin in the amount within the range of 0.2 to 15 percent by weight of the varnish component and with the monohydroxy compound being present in at least equal molecular proportions with the polyvalent metal alcohol during the formation of the reaction product.

---

This is a continuation of my copending application Ser. No. 499,081, filed Oct. 20, 1965, and entitled "Heat Set Printing Ink Vehicle," which was a continuation-in-part of my then copending application Ser. No. 343,442, filed Jan. 29, 1964, and entitled "Vehicle for Printing Inks," which was a continuation-in-part of application Ser. No. 188,266, filed Apr. 17, 1962, and entitled "Heat Set Inks," each of said continuation-in-part applications now being abandoned.

This invention relates to printing inks, and, more particularly, to a new and improved vehicle for printing inks of the types which are adapted to be set by heat and which are referred to in the trade as "heat set inks."

Heat set inks of the type described are generally employed in high speed printing, in various colors, where it is desired rapidly to set the ink after application to the surface of the paper. For this purpose, heat set printing inks are usually formulated with the pigmented vehicle dissolved or otherwise distributed in a diluent which is adapted substantially completely to be removed by volatilization within a very narrow temperature range. Thus, when the printed paper is passed over a drum heated to a desirable elevated temperature, or passed through an oven or over a gas flame or electric heating element, substantially all of the diluent is immediately flashed off to set the resinous based pigmented carrier on the paper.

Heat set inks of the type presently in use have the tendency to be drawn into the paper when heated to the elevated temperature for removal of the diluent and to set the ink. This results in a noticeable loss of gloss, and it also appears materially to slow the removal of diluent and the rate of set of the ink whereby it becomes necessary to slow the press or to decrease the amount of heat applied.

It is desirable to achieve as high a gloss as possible in the finished print, and it is also desirable, for economic reasons, to be able to run the press as fast as possible without limitations imposed by the printing ink, and it is therefore an object of this invention to produce a heat set ink capable of making such improvements available.

The increased gloss and the ability to run the press at higher speeds, as well as many other improvements, have been achieved by the preparation of an ink composition embodying the features of this invention. It will be understood that the examples of suitable ink vehicles set forth hereinafter are given solely by way of illustration and not by way of limitation.

The compositions of this invention involve the use of combinations of products which form the novel ink vehicles. The first such product, to be referred to as "component A" comprises the reaction product of a metal alcoholate with a material characterized by a single free hydroxy group. Such monohydroxy compounds can be selected from the group consisting of monohydroxy glycol ethers or monohydroxyl glycerol ethers, monohydroxy glycol esters and monohydroxy glycerol esters, other ethers and esters having a single free hydroxol group, an oxo alcohol, or a fatty alcohol.

A second component, referred to as the "varnish" component, comprises resin compositions selected from the group consisting of esters of rosins, esters of rosin and dibasic acid, hydrocarbon resins, or rosin modified phenolics is also employed. A critical characteristic of this component is the presence of free carboxyl groups. This component is combined with a solvent of any suitable type, preferably an aliphatic hydrocarbon. The resinous component and the solvent are treated whereby a clear varnish solution can be achieved. The "component A" is preferably diluted and then added to the hot varnish component. When this combination is produced in accordance with the limitations of the invention referred to herein, the ink vehicles referred to are achieved.

Vehicles produced in accordance with the above teachings have been found to be exceptionally stable. Suitable pigments can be ground into the vehicle to produce the printing ink without gelation of the vehicle or the development of other problems. Pigmentation to produce the ink is carried out in the conventional manner for ink preparation using rolling mills, ball mills and the like to grind the pigment into the vehicle.

When the paper printed with an ink composition formulated of these vehicles is brought into contact with the heated roll on the press having a temperature sufficient to flash off substantially all of the aliphatic hydrocarbon solvent and the diluent in the applied ink composition, the flash off occurs without the ink being drawn into the paper, at least not to the extent experienced with heat set inks of the type which have heretofore been produced. In any event, the printed image that remains on the paper has high gloss, and it appears to stand out on the surface of the paper. In addition, it is possible to run the press at a much faster rate for greater output without interference with the setting of the ink. Thus, the principal objectives are accomplished.

With respect to the ingredients employed in the practice of this invention, it is preferred to make use of alcoholates having a cation with a valency of three or more, such as aluminum, titanium, zirconium, iron, chromium, etc., but cations having a valency of two can be used but with lesser success from the standpoint of maximum gloss and production speed, although with better success than ink vehicles of the type heretofore employed.

In the metal alcoholate, it is desirable to make use of anions that are weakly bonded to the metal cation and which are capable of easy and ready replacement by monohydroxy groups. Corresponding molecular proportions of metal isopropylate, ethylate, propylate, butylate, isobutylate, pentylate, isopentylate, and the like, wherein the metal component is, for example, aluminum, zirconium, titanium, iron, chromium, calcium, barium, zinc, or cobalt are employed. The alcoholates are preferably formed from alcohols having from one to five carbon atoms.

The reactant with the metal alcoholate may comprise any glycol and glycerol ether or ester in which the glycol and glycerol ethers and esters are limited to compounds having but a single free hydroxyl group. Representative of the monohydroxy ethers and esters that can be employed, on an equal molecular basis, are:

Ethylene glycol monomethyl ether
Ethylene glycol monoethyl ether
Ethylene glycol monobutyl ether
Diethylene glycol monomethyl ether
Diethylene glycol monoethyl ether
Ethylene glycol monohexyl ether
Triethylene glycol monomethyl ether
Triethylene glycol monoethyl ether
Diethylene glycol monohexyl ether
Ethylene glycol monophenyl ether
Diethylene glycol monohexyl ether
Glycerol 1,3 diacetate
Glycerol 2,3 diacetate
Glycerol 1,3 dioleate
Glycerol 2,3 dioleate A monohydroxy ester alcohol of more than eight carbon atoms is also suitable. Use can be made, for example, of Texanol which is produced by Eastman Chemical Products and which comprises 2,2,4-trimethyl pentane diol mono isobutyrate. Where an oxo alcohol is employed, use can be made of tridecyl alcohol, hexadecyl alcohol and octyl alcohol. With respect to the fatty alcohols which can be utilized, oleyl alcohol, cetyl alcohol, myristyl and stearyl and similar compounds are considered representative examples.

It is desirable to make use of the materials in the ratio of at least one molecular weight of the monohydroxy material per molecular weight of the metal alcoholate up to a molecular weight of this ingredient per equivalent weight of the metal alcoholate. Preferably, as much as 25 percent excess of the monohydroxy material beyond the amount theoretically required is employed. It should be noted, however, that amounts greatly in excess of these figures could be employed without disrupting the process and these extra amounts may also be used to serve as all or part of the diluent. Thus, the amount of monohydroxy material must be sufficient to replace at least one of the alcohol groups per molecule of metal alcoholate and can be used in amounts sufficient to replace up to all of the alcohol groups of the metal alcoholate. In the usual preferred practice of the invention, use is made of a ratio of from 1.5 to 2.0 molecules of the monohydroxy per molecular weight of metal alcoholate.

Excellent results have been secured from the standpoint of high gloss and high speed in the printing process when the component A is incorporated in the printing ink in an amount to correspond to about 0.2 to 15 percent by weight of the varnish component of the carrier. When more than 15 percent by weight is employed, based upon the weight of the varnish, the resultant product often forms into a stiff gel which becomes difficult to pigment in the usual processes and machines for ink preparation. However, improvements in gloss are derived as a result of increasing amounts of component A beyond the minimum of 0.2 percent and amounts in excess of 15 percent are, in some instances, desirable where it is beneficial to have a gel as the carrier for the printing ink such as in many of the printing processes.

The exact mechanism operative to give improved gloss and printing speed by the practice of this invention is not, for the present, known. It is believed that at least one of the alcohol groups of the metal alcoholate is replaced by a monohydroxy group as evidenced by the removal of the corresponding alcohol during heating of the mixture to temperatures above the boiling point temperature for the alcohol, and that the resulting component A reaction product is capable of the combination with the varnish component, probably through the available carboxyl groups, to form a higher molecular weight resinous system than could otherwise be made available without providing instability in the varnish system or in the ink composition formulated therewith. It is possibly for this reason that the desired results are procured when the resinous component of the ink vehicle is of the type having an acid number or available free carboxyl groups, such as is provided in the alkyd resins, oil-modified alkyd resins, modified resins, rosin esters, and rosin-modified alkyd resins.

The resins utilized in accordance with this invention for formulating the varnish component are generally described as esters of rosin, esters of rosin and dibasic acids, or any rosin-modified phenolics suitable for use in printing ink vehicles. The resins are characterized by an available acid group for reaction with aluminum alcoholate preferably at temperatures in excess of 300° F. Suitable resins are described in the following U.S. patents: No. 1,623,901; No. 1,820,265; No. 2,322,197; and No. 2,344,194.

Other commercial resins suitable for use will be recognized by those skilled in the art. Included as suitable resins are those resins which are soluble in aliphatic solvents having a KB value between 20 and 40, and having an available carboxyl group for reaction with the aluminum alcoholate. Typical examples of such resins are the polymerized mixtures of unsaturated refinery by-products to which has been added from 2 to 12 percent fumaric acid. Commercially available resins include the K 484 and K 444 resins produced by the Krumbhaar Company and Pentalyn K produced by the Hercules Corporation.

The following comprises specific examples of the practice of this invention.

EXAMPLE I

Preparation of component A

To one part by weight of aluminum isopropylate there is added two parts by weight of diethylene glycol monohexyl ether (hexyl Carbitol), and the materials are gradually heated up to a temperature of about 250° F. The hexyl carbitol replaces isopropylate alcohol which distills off during the heating step. The product may be cooled or used directly without cooling in the preparation of the vehicle described below.

Preparation of varnish

To forty-five parts by weight of a pentaerythritol ester of dimerized resin there is added twenty-three parts by weight of an aliphatic hydrocarbon having a narrow boiling point range of 450° to 510° F. (Magie 470 oil), and the mixture is heated to a temperature of about 390° F. until solution is complete, as indicated by the formation of a clear liquid. When a clear solution has been reached, the solution is further diluted by the addition of fourteen parts by weight of the aliphatic hydrocarbon.

Preparation of vehicle

Four parts by weight of the component A is diluted in thirteen parts by weight of the aliphatic hydrocarbon used as the diluent in the preparation of the varnish and the mixture is then added slowly to the still hot varnish with sufficient agitation to avoid seeding. Combination at a temperature within the range of 300° to 360° F. is desirable and the mixture is then allowed to cool.

EXAMPLE II

Preparation of component A

To one part by weight of aluminum ethylate there is added two parts by weight of diethylene glycol monobutyl ether, and the materials are gradually heated to a temperature of about 240° F. The diethylene glycol monobutyl ether replaces the ethyl alcohol of the aluminum ethylate, the ethyl alcohol coming off as a vapor during the heating step.

The composition of Example II may be substituted in the preparation of the vehicle in Example I.

EXAMPLE III

Preparation of component A

To one part by weight of titanium isobutylate there is added three parts by weight of propylene glycol methyl ether, and the materials are heated to a temperature of about 265° F. after which the material is allowed to cool.

This product A can also be substituted in Example I.

EXAMPLE IV

Preparation of component A

Two parts by weight of tridecyl alcohol were combined with one part by weight of aluminum ethylate, the materials being heated gradually to a temperature of about 250° F. The composition of this example may be substituted in the preparation of the vehicle of Example I.

EXAMPLE V

Preparation of component A

Three parts by weight of hexadecyl alcohol were added to one part by weight titanium isobutylate. The combination of materials was heated to a temperature of about 265° F. and was thereafter allowed to cool. The product of this example can be substituted for the materials employed in Example I.

EXAMPLE VI

Preparation of component A

To one part by weight of aluminum isopropylate, there is added two parts by weight of oleyl alcohol and the materials are gradually heated to a temperature of about 250° F. The oleyl lcohol replaces isopropylate alcohol which distills off during the heating step.

The product can be cooled or used directly in the preparation of the vehicle of Eample I.

EXAMPLE VII

Preparation of component A

To one part by weight of aluminum isopropylate there is added two parts by weight of 2,2,4-trimethyl pentane diol mono isobutyrate (Texanol) and the materials are gradually heated up to a temperature of about 250° F. The Texanol replaces isopropylate alcohol which distills off during the heating step. The product may be cooled or used directly without cooling in preparing the vehicle.

EXAMPLE VIII

Preparation of component A

Three parts by weight of Texanol were added to one part by weight titanium isobutylate. The combination of materials was heated to a temperature of about 265° F. and was thereafter allowed to cool. The product of this example can be substituted for the materials employed in Example I.

It will be appreciated that the use of a polyvalent metal alcoholate comprises a critical aspect of the instant invention. The criticality of this addition is best illustrated by a comparison of the results of this invention with procedures involving the use of elemental aluminum. In the latter case, tarnishing of the pigment or generation of hydrogen was observed and no beneficial effects insofar as the ink vehicle was concerned were apparent.

It will be apparent from the foregoing that there is provided a new and improved ink vehicle for use in the preparation of heat set inks having improved gloss and improvements from the standpoint of its press characteristics, whereby the press can be operated at high speed with better results to produce an improved printed ink image.

In that the instant invention is directed to an ink vehicle, the particular pigment added thereto is not of critical significance. It has been found, however, that all commercially used pigments, including acidic pigments, which have been tested, provide entirely satisfactory results. The following are representative of ink compositions embodying the features of this invention and prepared with the vehicles of this invention.

EXAMPLE IX

Black ink:                                        Parts by weight
  Carbon black pigment (channel black) _____ 18
  Vehicle of Example I _____ 67
  Blue toner _____ 5
  Kerosene _____ 7
  Alkyd resin _____ 3

EXAMPLE X

Red ink:                                          Parts by weight
  Barium lithol red pigment _____ 25
  Chrome-orange pigment _____ 10
  Vehicle of Example I _____ 57
  Mineral seal oil _____ 8

It will be understood that changes may be made in the diluents employed in Example I, or in the diluents in the printing ink vehicle. The amounts and types of diluents employed in the processing are not critical since they are based upon widely recognized techniques well-known to those skilled in the art. Thus, these diluents are utilized in proportions which depend upon the rate of drying of the printing ink, and this rate in turn depends upon the equipment available as well as upon the particular job involved. The types of heated rolls or other heating elements employed in the drying apparatus, will, for example, vary considerably from installation to installation. The skill of the operator of the installation determines the amount of diluent employed, and there is no reliable formula available for such determinations. The solvents used in various stages of the process and the diluents may be of the same composition in accordance with known practices. Reference is made only to solvents in the appended claims for purposes of simplicity; however, it will be appreciated that this term refers to solutions actually used in an active manner for dissolving reactants and to solutions which are used primarily as diluents for purposes of improving the handling characteristics of the vehicle.

It will be noted that the foregoing description and the following claims refer to the use of a varnish component made up of resinous materials. It will be understood that this terminology is employed solely for convenience and no special characteristics are to be attributed to this component because of the terminology.

It will be understood that various changes and modifications may be made in the formulas and techniques described above which provide the characteristics of this invention without departing from the spirit thereof, particularly as defined in the following claims.

I claim:

1. In the method for producing a vehicle for heat set printing inks wherein the vehicle includes a solvent for facilitating the application of the ink, said solvent being flashed off during setting of the ink after application, the improvement comprising the steps of preparing a solvent solution of a resinous material for use in said vehicle in which the resinous material is prepared by reacting a polyvalent metal alcoholate formed of alcohols having from 1 to 5 carbon atoms with a monohydroxy compound selected from the group consisting of a monohydroxy glycol ether, a monohydroxy glycerol ether, a monohydroxy glycol ester, a monohydroxy glycerol ester, a monohydroxy oxo-alcohol and a monohydroxy fatty alcohol, said reaction being carried out at a temperature above the boiling point temperature of the alcohol group in the alcoholate, and combining said reaction product with a varnish formed of a modified rosin having at least one free carboxyl group selected from the group consisting of a rosin ester, a dibasic acid modified rosin ester and a rosin ester modified phenolic resin and a resin containing at least one carboxyl group and soluble in aliphatic solvents having a KB value of 20–40.

2. The method as claimed in claim 1 in which the combination of the reaction product and varnish is reacted at a temperature in excess of 300° F.

3. The method as claimed in claim 1 in which the reaction product is combined with the varnish component in an amount within the range of 0.2 to 15 percent by weight of the varnish component.

4. The method as claimed in claim 1 in which the monohydroxy compound is present in at least a molecular ratio of 1 to 1 with the polyvalent metal alcoholate during formation of the reaction product.

5. The method as claimed in claim 1 in which a diluent is added to the varnish component before addition of the reaction product.

6. The method as claimed in claim 1 in which the reaction product is dissolved in a diluent before combination with the varnish component.

7. In a vehicle for heat set printing inks wherein the vehicle includes a solvent for facilitating the application of the inks, the solvent being flashed off during setting of the ink after its application, the improvement in said vehicle comprising a solvent solution of a resinous material consisting essentially of the combination of a varnish component formed of resin compositions having free carboxyl groups and a reaction product formed from the reaction of materials consisting essentially of a polyvalent metal alcoholate formed of alcohols having from 1 to 5 carbon atoms and a material characterized by a single free hydroxy group selected from the group consisting of a monohydroxy glycol ether, a monohydroxy glycerol ether, a monohydroxy glycol ester, a monohydroxy glycerol ester, a monohydroxy oxo-alcohol and a monohydroxy fatty alcohol, said reaction involving the replacement of alcohol groups of said alcoholates, said alcoholate and said material being reacted to form said reaction product at a temperature above the boiling point temperature of the alcohol of the alcoholate.

8. A vehicle as claimed in claim 7 in which the monohydroxy material is present in an amount of at least about a 1 to 1 molecular ratio during formation of said reaction product.

9. A vehicle as claimed in claim 7 in which said reaction product is present in an amount within the range of 0.2 to 15 percent by weight of said varnish component.

10. A vehicle as claimed in claim 7 wherein the material characterized by a single free hydroxy group is selected from the group consisting of monohydroxy glycol ethers and esters, monohydroxy glycerol ethers and esters, fatty alcohols and oxo-alcohols.

References Cited

UNITED STATES PATENTS

| 2,892,780 | 6/1959 | Rinse | 106—285 XR |
| 2,948,743 | 8/1960 | Rinse | 106—27 XR |
| 3,025,258 | 3/1962 | Hicks. | |

FOREIGN PATENTS

| 211,926 | 12/1957 | Australia. |
| 212,590 | 6/1958 | Australia. |

PHILIP E. ANDERSON, Primary Examiner

J. B. EVANS, Assistant Examiner

U.S. Cl. X.R.

106—30, 219, 243, 311; 260—18, 32.2